United States Patent [19]

Kohn

[11] 4,208,369

[45] Jun. 17, 1980

[54] TECHNIQUE FOR CONVERTING BALSA LOGS INTO PANELS

[75] Inventor: Jean Kohn, New York, N.Y.

[73] Assignee: Baltek Corporation, Northvale, N.J.

[21] Appl. No.: 894,047

[22] Filed: Apr. 6, 1978

Related U.S. Application Data

[63] Continuation-in-part of Ser. No. 860,617, Dec. 14, 1977, Pat. No. 4,122,878.

[51] Int. Cl.² .................................................. B29D 7/18

[52] U.S. Cl. .............................. 264/46.5; 144/309 D; 144/309 AC; 144/316; 144/317; 156/79; 156/254; 156/258; 156/296; 156/331; 264/154; 264/261; 264/279

[58] Field of Search .................... 156/78, 79, 250, 254, 156/264, 296, 245, 331, 156, 258; 144/309 D, 309 AC, 311, 314 R, 315 R, 316, 317, 327; 264/139, 261, 263, 279, 45.1, 46.4, 46.5, 158; 100/42, 232

[56] References Cited

U.S. PATENT DOCUMENTS

| | | | |
|---|---|---|---|
| 2,409,785 | 10/1946 | Newmark et al. | 156/264 |
| 3,827,353 | 8/1974 | Isberg | 100/232 |
| 3,895,984 | 7/1975 | Cone et al. | 156/79 |
| 3,897,581 | 7/1975 | Nakatsuka et al. | 156/79 |
| 3,963,064 | 6/1976 | Hayes | 144/309 AC |
| 3,977,449 | 8/1976 | Sadashige | 144/316 |
| 3,981,338 | 9/1976 | Jones | 144/317 |

FOREIGN PATENT DOCUMENTS

| | | | |
|---|---|---|---|
| 963257 | 2/1975 | Canada | 144/316 |

OTHER PUBLICATIONS

Adhesive Bonding . . . Manufacture, Apr. 1967, pp. 1, 19, 33.

*Primary Examiner*—Jerome W. Massie
*Attorney, Agent, or Firm*—Michael Ebert

[57] ABSTRACT

A high yield technique for converting normally-unusable round logs of balsa or other species of wood whose diameter is less than about 4 inches into large rectangular panels. The raw logs are first peeled to expose the wood and are then cut into round pieces of a desired length. The pieces, after being kiln dried, are assembled into a block, the pieces being coated with a curable adhesive and being subjected to compression in orthogonal directions until the adhesive is cured and the pieces interlaminated to provide an integrated stock block. The stock block is then divided into panels of the desired thickness and grain direction.

9 Claims, 9 Drawing Figures

Fig.1.
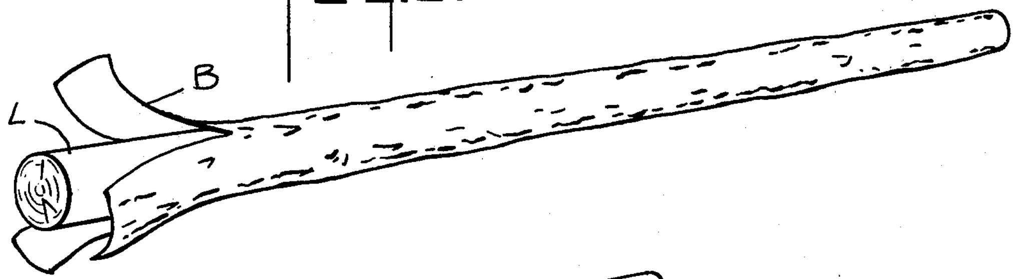
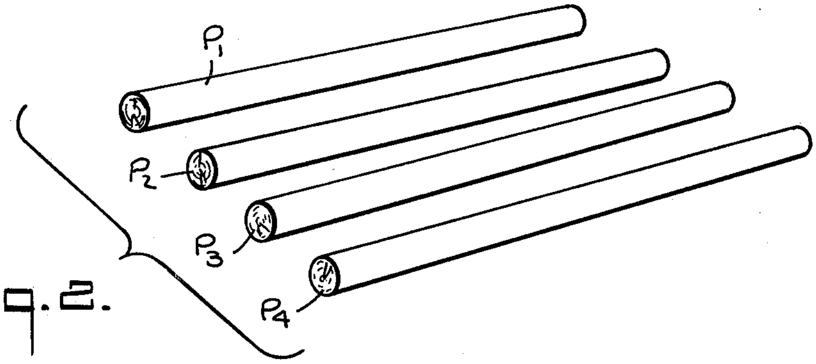
Fig.2.
Fig.3.
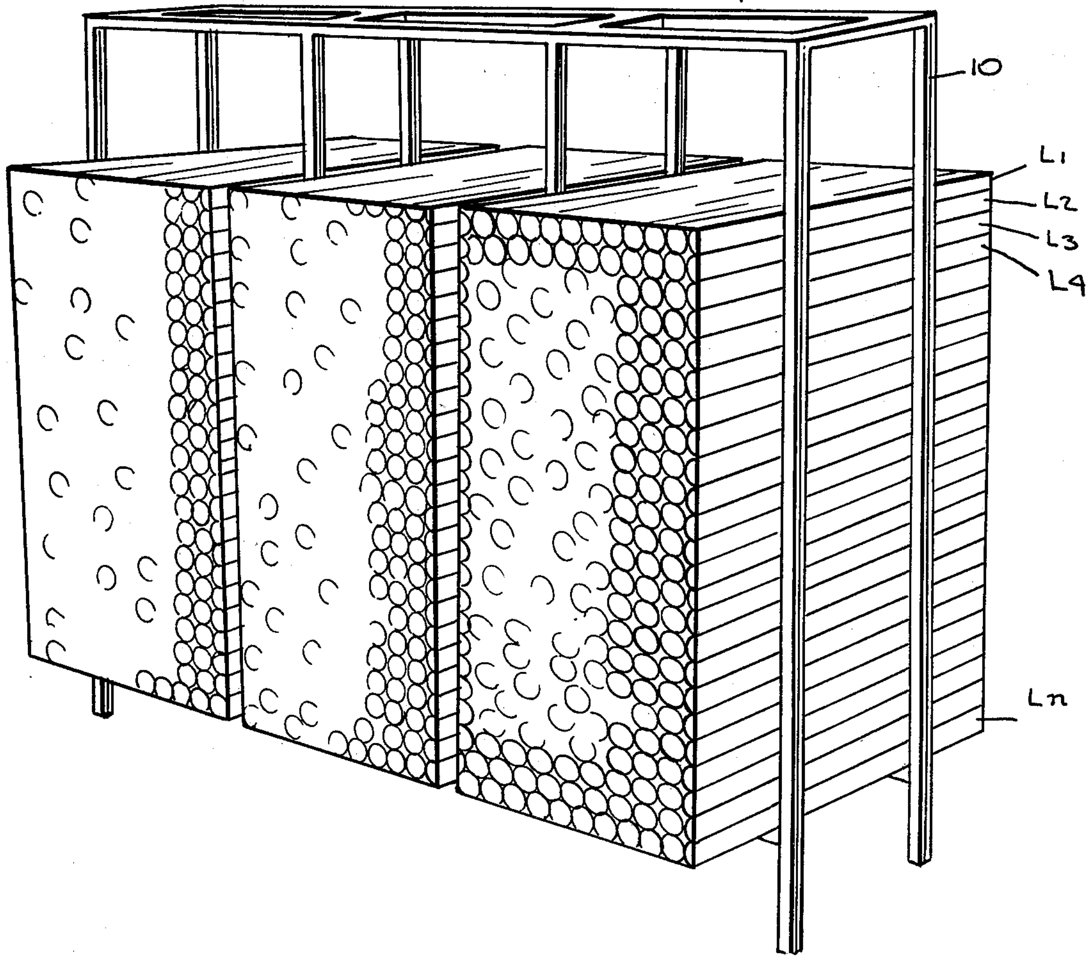

Fig. 4.
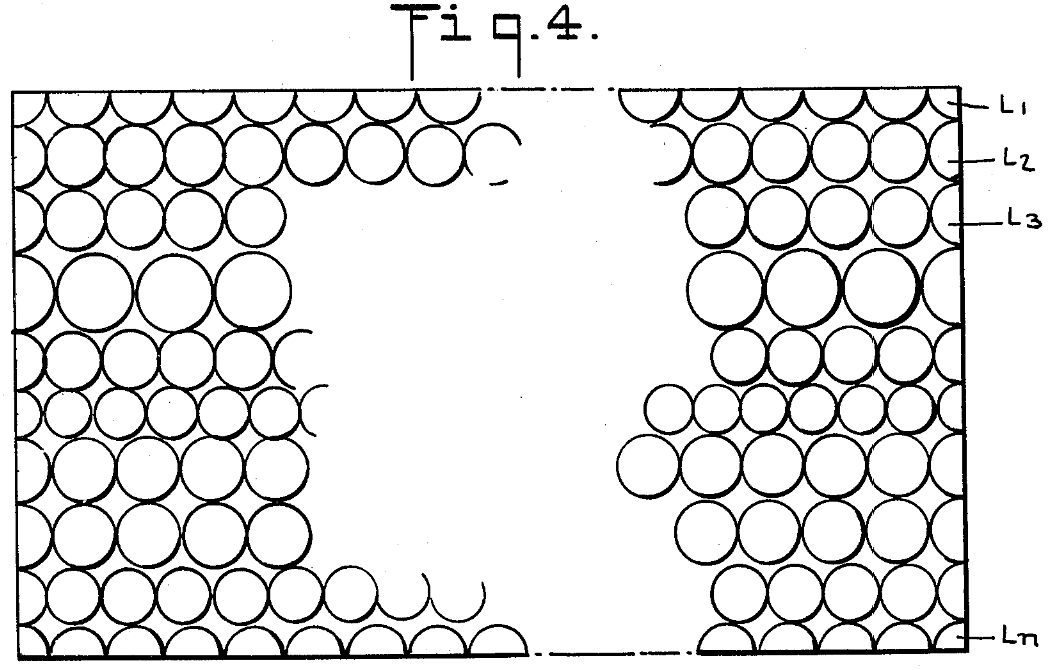
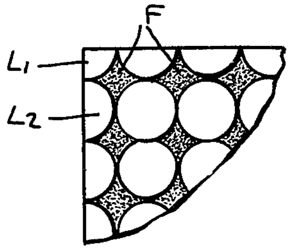
Fig. 6.
Fig. 5.
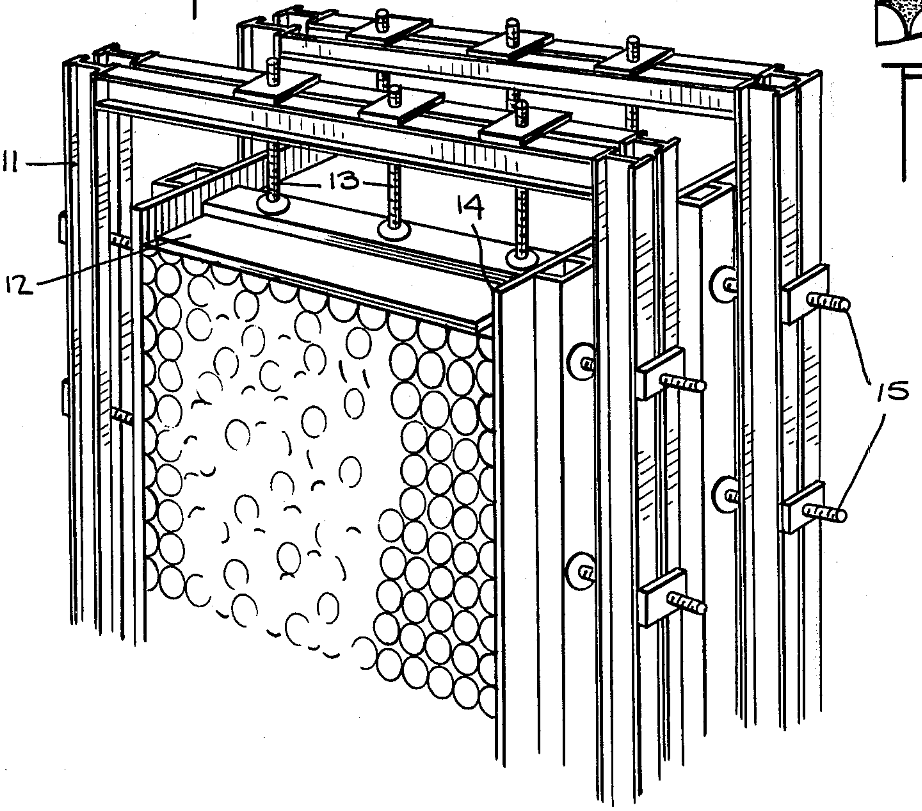

TECHNIQUE FOR CONVERTING BALSA LOGS INTO PANELS

RELATED APPLICATION

This application is a continuation-in-part of copending application Ser. No. 860,617, filed Dec. 14, 1977, now U.S. Pat. No. 4,122,878, entitled "Technique for Converting Balsa Logs into Panels."

BACKGROUND OF INVENTION

This invention relates generally to a technique for converting small round logs into lumber products, and more particularly to a technique in which logs of small diameter are cut into pieces that are fitted together to create superposed layers forming a block assembly, the pieces in the block assembly being interlaminated to form an integrated stock block that is dividable into usable panels.

A technique in accordance with the invention, though applicable to various species of wood, is of particular value in connection with balsa wood derived from a tropical American tree (Ochroma pyramidale). Balsa wood has outstanding properties unique in the lumber field; for on the average, it weighs less than 9 pounds per cubic foot, this being 40% less than the lightest North American species. Its cell structure affords a combination of high rigidity and compressive and tensile strength superior to any composite or synthetic material of equal or higher density. While a technique in accordance with the invention will be described herein only in regard to balsa wood, it is to be understood that it is also applicable to other wood species.

The market potential for balsa wood board is considerable; for structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end grain balsa wood, the laminates having an exceptionally high strength-to-weight ratio as well as excellent thermal insulation properties.

End-grain balsa-cored sandwich laminates are widely used in transportation and handling equipment, such as for floors of railroad cars, shipping containers, cargo pallets, bulkheads, doors, reefer bodies, as well as in a wide variety of other applications. These laminates are also employed for structural insulation in aircraft applications, housing and in boating.

Quite apart from the structural merits of balsa, this wood is of particular value in cryogenic applications, for it has a low coefficient of expansion and hence deforms only slightly under severe temperature changes. Moreover, the k-factor of balsa wood is such as to render this material highly suitable as thermal insulation. The symbol for thermal conductivity is the k-factor, this being the amount of heat expressed in BTU's transmitted in one hour through one square foot of homogeneous material, for one inch thick, for each degree of Fahrenheit of temperature difference between opposed surfaces of the material.

As noted in my above-identified copending application whose entire disclosure is incorporated herein by reference, the cost of balsa wood products is keyed to the low yield obtainable when employing conventional techniques to convert balsa logs into usable products. The traditional conversion technique results in a low yield in that the amount of balsa convertible into usable lumber is usually less than half the total volume of wood in the log, the balance being wasted.

In the traditional process, a series of longitudinal cuts are made through the log to produce so-called "flat sawn" pieces whose broad faces lie in a plane parallel to a tangent to the curvature of the cylindrical log. Flat sawn pieces not only give rise to a substantial amount of wood waste, but such pieces tend to warp during the kiln drying process. And even when adequately dried, flat sawn pieces undergo dimensional changes as a result of variations in air moisture or relative humidity, this resulting in deformation of the final product.

In order to improve the yield obtained from cylindrical logs, it is known to cut logs into interfitting sectors and to join these sectors together to form lumber products. Among U.S. patents which disclose a process for making lumber products in this manner are the Sorensen patent 781,376, the Anderson U.S. Pat. No. 2,878,844 and the U.S. Pat. Nos. to Hasenwinkle, 3,903,943; 3,961,644 and 3,989,078.

As pointed out in my copending application, none of these prior patents discloses a high yield technique which, when applied to balsa wood, results in balsa wood panels that can be either of the end grain or flat grain type, and which makes it possible to exploit balsa logs in a broad range of diameters running between very young trees having a four-inch diameter and fully mature trees of twenty-inch diameter or greater.

Balsa trees are fast growing and reach cutting maturity within six to eight years, at which time the diameter at breast high (DBH) can be 10 to 12 inches. The technique disclosed in my copending application makes use of young balsa trees of a diameter as small as four inches that are lighter and more readily available than older and larger trees, the technique lending itself to large scale balsa production on ordinary plantations with a very rapid turnover of trees in the order of four to six years.

The present invention, as distinguished from that disclosed in my copending application, makes it possible to exploit logs taken from the branches and upper parts of trees having diameters in the range of about 1½ to 4 inches, such branches and tree parts normally being unsuitable for the production of lumber products. In addition to such branches, the present invention makes use of very young trees whose trunk diameters lie in a range of 1½ to 4 inches.

The economics of converting balsa logs into commercially-available lumber products must take into account a number of factors, such as growth time, kiln drying costs and the relationship of yield to tree diameter. The traditional conversion technique for producing balsa lumber products from logs having a diameter of 12 inches or greater inevitably results in products which are expensive; for it not only requires about eight years before the trees can be harvested to produce logs of this size, but kiln costs are high and the yield is low in that a large percentage of the wood is wasted in the conversion process.

A marked improvement in the economics of converting balsa logs into usable product is gained by the technique disclosed in my copending application; for in this technique, logs as small as four inches in diameter are radially cut into sectors having the same apex angle, each sector then being longitudinally sliced at its apex and arc to form a truncated piece having a trapezoidal cross-section, only a relatively small percentage of the wood being wasted. The pieces are thereafter fitted together in a complementary manner and interlaminated to form an integrated stock block which is dividable into panels.

The technique disclosed in my copending application makes it possible to commercially exploit a broad range of balsa log diameters, running from small diameter logs cut from trees which take only 9 to 10 months to grow to large diameter logs cut from more mature trees that take at least 5 to 8 years to grow. In this way, better use can be made of the available acreage. And because the logs are cut radially, the resultant area of the exposed surfaces is greater than that obtained with conventionally cut logs, thereby markedly reducing kiln drying time and its attendant costs. But even more important is the fact that the yield is exceptionally high; for, as compared to a traditional conversion which requires 60 logs of 12-inch diameter and 16 feet length to produce 1,000 board feet of balsa product, the technique disclosed in my copending application yields the same amount of product from merely 20 such logs.

SUMMARY OF INVENTION

The main object of the present invention is to provide a novel technique for converting into lumber products logs of a diameter smaller than the smallest diameter which can be converted on a commercial scale by the technique disclosed in my copending application; namely, logs cut from trees whose diameters lie in a range of about 1½ inches to 4 inches.

It must be borne in mind that balsa grows at a fairly rapid rate, and while it takes at least 8 years for a tree to mature, the diameter of the tree after only 3 months is about 2 inches, and after 9 months about 4 inches. Young balsa trees are generally thickly planted, but most of these die off after the first two years; for the laws of natural selection doom all but the fittest or best placed trees which survive and grow to maturity.

More specifically, it is an object of the invention to provide a technique to harvest and convert balsa trees after a few months, well before natural selection takes over, whereby the yield from a given acreage is enormously increased. Since a single acre can easily support thousands of young trees in the 2 to 4 inch diameter range, with a technique which utilizes without waste the whole log derived from such trees, much more usable wood product can be obtained than from techniques of the type heretofore known.

A significant advantage of the present invention resides in the fact that it takes no more than about three months for a balsa tree to reach a diameter of 2 inches with a usable log length of 8 feet; hence four thousand trees can be harvested per acre three times a year, each tree giving 2 board feet of usable cylindrical wood substance. Thus one acre will provide 24,000 board feet per year and in eight years the same acre will yield 192,000 board feet, a quantity far greater than the yield derivable from the traditional technique and exceeding that obtainable by the technique disclosed in my copending application.

Also an object of the invention is to provide a technique for converting logs of small diameter into lumber products without having to cut the logs into sectors, such cutting resulting inevitably in the waste of wood.

Briefly stated, these and other objects of the invention are attained in a high yield technique for converting balsa logs in a range of diameters from about 1½ inches to 4 inches into rectangular panels and other lumber products. The technique involves the steps of peeling the raw logs to expose the wood, cutting the peeled logs to a suitable length such as three feet to produce round pieces, and kiln drying the round pieces to a moisture content of about 12% or less.

The dried pieces are then assembled into a block, the pieces being coated with a curable adhesive and being subjected to compression in orthogonal directions until the adhesive is cured and the pieces interlaminated to provide an integrated stock block. The interstices in the stock block defined by the interlaminated round pieces may be filled with foam plastic material. Finally, the stock block is divided into rectangular panels of the desired thickness and grain direction.

OUTLINE OF DRAWINGS

For a better understanding of the invention as well as other objects and further features thereof, reference is made to the following detailed description to be read in conjunction with the accompanying drawings, wherein:

FIG. 1 shows a raw log of small diameter which is convertible into lumber products by a technique in accordance with the invention;

FIG. 2 illustrates the logs after they are peeled and cut to form round pieces of like length;

FIG. 3 is a perspective view of a frame for assembling the round pieces into a stack;

FIG. 4 is an end view of the stack;

FIG. 5 illustrates a press for interlaminating the pieces in the stack to produce an integrated block;

FIG. 6 shows in end view a portion of the integrated block of round pieces after the interstices thereof have been filled in a mold with synthetic foam material;

DESCRIPTION OF INVENTION

Figure 7:
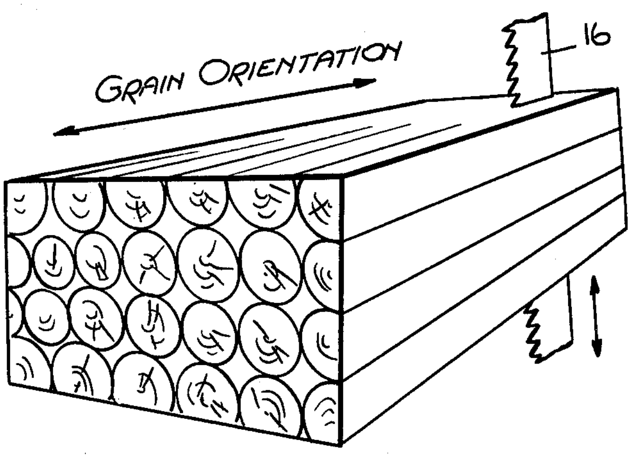
FIG. 7 illustrates the manner of sawing the integrated block in one direction to produce flat grain rectangular panels.

Referring now to FIG. 1, the first step in a technique in accordance with the invention is to harvest young balsa trees to obtain logs about 1½ inches to 4 inches in diameter, with trunk lengths running 6 feet to 8 feet and longer, depending on the tree. In addition to such young trees, use can also be made of the small diameter branches cut from trees whose trunks are of much larger diameter. Such thin branches are ordinarily discarded as valueless.

The balsa log L, as shown in FIG. 1, has a thin bark and the next step is to peel off the bark B to expose the underlying wood. Since balsa grows only in tropical countries where the flow of sap is on a year round basis rather than in the spring only as in the northeastern part of the United States or in other temperate climates, peeling of the balsa logs in any season presents no problem and is easily accomplished.

The peeled logs are then transversely cut, as shown in FIG. 2, to form round pieces $P_1$, $P_2$, $P_3$ etc., all of the same length, say, three or four feet. The diameters of the pieces depend, of course, on the diameters of the trees from which they are derived.

The round pieces are then kiln-dried in a conventional hot-air oven of the type used for lumber drying. This procedure acts to reduce the moisture content of the pieces to 12 percent or less, this being standard practice in the lumber industry. It is to be noted that because the piece diameters are small, the interior region of the wood is close to the exposed surface and can therefore be quickly dried. The procedures for kiln-drying wood and recommended practices therefor are set forth in publication #188 of the U.S. Dept. of Agriculture, Forest Service, Forest Products Laboratory.

The round pieces $P_1$, $P_2$ etc. are then sorted into pieces of substantially the same diameter. Thus all 1½ inch diameter pieces may be put in one pile, all 2 inch diameter pieces in a second pile, and so on. The next step, as shown in FIG. 3, is to assemble the pieces in superposed layers $L_1$, $L_2$, $L_3$ to $L_n$ to form a stack in which each layer is formed of pieces of substantially the same diameter. Thus if the round pieces are graded into six classes—small (1½"), medium-small (2"), medium (2½"), medium-large (3"), large (3½") and extra-large (4"), each layer in the stack is constituted by pieces chosen from a given class. Thus the layers each have a substantially uniform height, although the heights may vary from layer to layer.

These stacked layers are temporarily held in place in a simple multi-stack frame 10 to form dry block assemblies. In practice, each assembly may be two feet wide and four feet tall or whatever other practical dimensions are dictated by the available equipment.

In order to form lateral faces or vertical block edges, the ends of each of the intermediate layers ($L_2$ etc.), as shown in FIG. 4, are terminated by round piece halves, the diametric faces forming a vertical edge. And in order to provide flat horizontal faces on the lowermost and uppermost layers of the stack ($L_1$ and $L_n$), these layers are formed by round piece halves, except at the ends where round piece quarters are provided.

To form an integrated block, the pieces of the dry block assembly are taken from frame 10 and wet-coated with a suitable water-resistant adhesive resin such as urea formaldehyde or phenol resorcinol formaldehyde, the wet pieces being reassembled in a cold setting press, as shown in FIG. 5. This press is provided with an I-beam frame 11 which is large enough to accommodate the block assembly, an adjustable horizontal pressure plate 12 operated by vertical screws 13 and an adjustable vertical pressure plate 14 operated by horizontal screws 15, pressure plate 12 being movable toward or away from the top surface of the block assembly and pressure plate 14 being movable toward or away one side of the block assembly. The bottom surface of the block assembly rests on a base plate in the press and the other side surfaces of the block assembly abut a fixed side plate.

By turning in the vertical and horizontal screws to press the pressure plates against the wet block assembly, the assembly in the press is subjected to compression in orthogonal directions. This condition is maintained until such time as the adhesive is fully cured and the pieces laminated together to form an integrated stock block.

The integrated stock block, when removed from the press, is formed by interlaminated round pieces which are tangentially in contact with each other; hence there are interstices between the pieces. But because the diameters of the pieces are relatively small, the interstices are also quite small, and for certain commercial purposes these may be tolerated. Where the stock block is cut into rectangular panels, these panels will have voids therein defined by the spaces between interlaminated round pieces. However, when the panel serves as the core of a light-weight structural sandwich laminate in which the core is interposed between upper and lower skins, the skins cover the voids; and while the laminate so produced may by inferior in terms of its thermal properties to a laminate having a solid balsa core, the structural properties of the laminate are excellent.

In the technique disclosed in my copending application, the logs are sectioned into sectors whose apexes are sliced off. Since the apex is derived from the pith or central zone of the log, the ultimate lumber product does not include the pith region of the logs. Normally, in terms of lumber quality, the pith of a balsa log constitutes the least desirable portion thereof, and the waste of the pith area is therefore inconsequential. But in the present invention, since use is made of the whole log, the pith is retained. In a log of small diameter, the pith represents a significant percentage of the total volume, whereas in a log of large diameter it represents a much smaller percentage. The fact that the pith is retained and constitutes a significant percentage of the total volume represents a drawback only in terms of structural strength of the ultimate product, but it is advantageous in those situations in which the main desideratum is light weight accompanied by good strength; for a balsa product having a relatively high percentage of pith material is measurably lighter than one which excludes this material. There are many practical applications where the reduced weight is of considerable value.

Where the presence of voids in the panel derived from the stock block is not acceptable, these voids can be filled in with material having thermal insulation properties comparable or even superior to those of balsa wood, such as polyvinyl chloride foam. To fill the voids with foam, the integrated block, after being removed from the press, is then transferred to a mold. Use is preferably made of polyurethane foam. After the mold is closed, a suitable catalyzed foam is introduced therein, the foaming action exerting a pressure which forces the foam material into the voids. When the foam is cured, the interstices are filled with a rigid or semi-rigid foam F that adheres to the exposed balsa wood surfaces, as shown in FIG. 6.

Alternatively, the mold may be used both as a press and as a means to fill the voids, and for this purpose use is made of a foam polymer such as polyurethane which has good gluing properties with respect to wood. Hence there is no need to first interlaminate the round pieces in a press to form an integrated block and then fill the voids in a mold, for both steps can be carried out in the mold adapted to apply pressure to the dry assembly of round pieces and to introduce a foam which fills the spaces.

Figure 8:
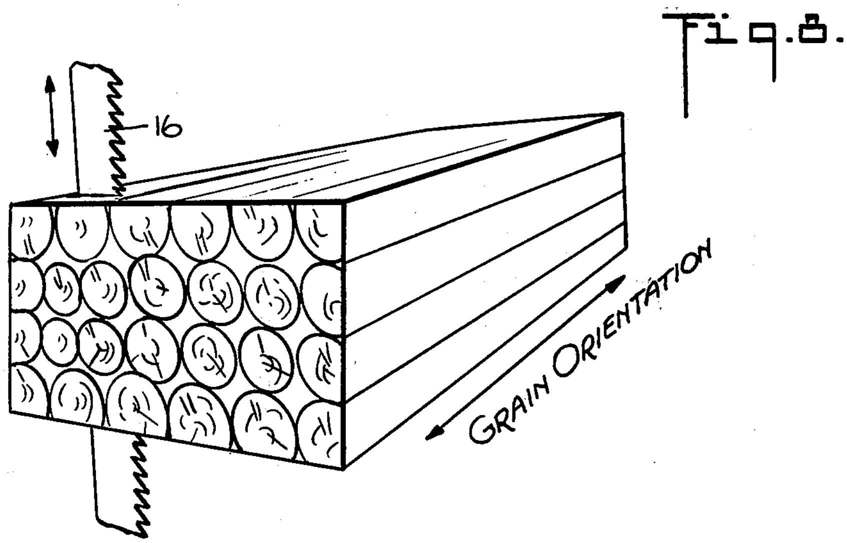
FIG. 8 illustrates sawing in another direction the integrated block to produce end grain rectangular panels.

The integrated stock block has a grain direction that extends longitudinally, for all round pieces thereof have the same orientation. This stock block can now be divided to provide either flat grain or end grain balsa panels of the desired thickness. A flat grain panel is one in which the balsa fibers run parallel to the faces of the panel. To produce flat grain panels, the stock block, as shown in FIG. 7, is sliced into panels by a wide band saw 16 operating in the longitudinal direction of the block. An end grain panel is one in which the balsa fibers are perpendicular to the faces. The same stock block may be divided to provide end grain panels. In this instance, as shown in FIG. 8, saw 16 is operated in the transverse direction of the block.

The end grain or flat grain panels thus produced are then planed or sanded, as the case may be, to obtain either a better finish or a more precise thickness. Flat grain panels can be sanded or planed, whereas end grain panels can only be sanded. The panels are then trimmed to the width and length specified by the ultimate user.

Instead of using a pure foam material to fill in the voids, the foam may have uniformly dispersed therein balsa wood particles or sawdust which serves as a foam filler. This mixture, when cured, plugs the voids with a filler comparable in some respects to plastic wood. Alternatively, instead of foam, one can create a filler by mixing balsa sawdust or chips with a flowable resin which when cured produces a wood-like plug in the interstices of the stock block.

Figure 9:
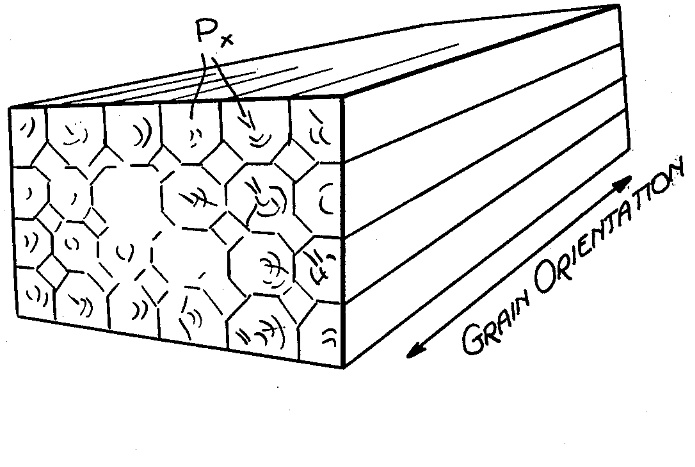
FIG. 9 is an end view of a modified form of integrated block whose pieces have a hexagonal cross-section.

In the integrated stock block shown in FIG. 9, the pieces $P_x$ which are interlaminated have a hexagonal cross-section, so that the pieces intermesh without creating interstices. Such shaped pieces can be produced at low cost by the use of a milling machine through which one passes the round pieces of small diameter, the machine planing the surface of the pieces into a hexagonal formation. One can also avoid interstices by planing the pieces to assume a square or rectangular formation.

While there has been shown and described a preferred embodiment of an improved technique for converting balsa logs into panels in accordance with the invention, it will be appreciated that many changes and modifications may be made therein without, however, departing from the essential spirit thereof.

I claim:

1. A technique for producing panels composed primarily of balsa wood comprising the steps of:

A. cutting balsa trees whose trunk or branch diameters are in a range of about 1½ to 4 inches into raw logs having a length of about 6 feet or greater;

B. peeling the bark from the raw logs to expose the underlying wood;

C. cutting the peeled logs into round pieces of like length;

D. kiln drying the pieces;

E. assembling the dried pieces into a dry stack constituted by multiple layers of kiln-dried pieces to form a temporary block of loose pieces;

F. individually wet coating the pieces of the temporary block with a cold setting adhesive and reassembling the pieces to form a wet stack which is then subjected to pressure in directions at right angles to each other for interlaminating the pieces in the wet stack to produce when the adhesive is cured an integrated stock block; and G. dividing said block into panels.

2. A technique as set forth in claim 1, wherein said pieces are kiln-dried to reduce the moisture content to about 12 percent.

3. A technique as set forth in claim 1, wherein said kiln-dried pieces which are of different diameter are sorted into classes, each having pieces of substantially the same diameter, each layer in said dry stack being made up of pieces from a given class whereby the layer has a substantially uniform height.

4. A technique as set forth in claim 1, wherein said integrated stock block has interstices therein defined by the interlaminated round pieces, said interstices being filled with a material having thermal properties comparable to balsa before said block is divided.

5. A technique as set forth in claim 4, wherein said interstices are filled, in situ, with foam plastic material.

6. A technique as set forth in claim 5, wherein said filling is effected in a mold which is closed about said block, after which foam is introduced in catalyzed form to fill said interstices.

7. A technique as set forth in claim 5, wherein said plastic material has a sawdust filler dispersed therein.

8. A technique as set forth in claim 5, wherein said foam plastic is polyurethane foam.

9. A technique as set forth in claim 1, wherein the round pieces are shaped into a formation having flat sides so that in the subsequent assembly thereof, interstitial spaces between the pieces are minimized.

* * * * *